(12) United States Patent
Macfarland et al.

(10) Patent No.: US 12,441,240 B2
(45) Date of Patent: Oct. 14, 2025

(54) ELECTRIC VEHICLE DRIVING AID METHOD AND SYSTEM

(71) Applicant: Ford Global Technologies, LLC, Dearborn, MI (US)

(72) Inventors: Cornelius Macfarland, Dearborn, MI (US); Daniel K. Tuttle, Ann Arbor, MI (US); David Michael Russell, Ann Arbor, MI (US); Kirk White, Ferndale, MI (US); Donald A. Perlick, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 18/315,221

(22) Filed: May 10, 2023

(65) Prior Publication Data
US 2024/0375582 A1    Nov. 14, 2024

(51) Int. Cl.
| | |
|---|---|
| *B60Q 9/00* | (2006.01) |
| *B60K 35/00* | (2006.01) |
| *G06T 11/20* | (2006.01) |
| *H04R 3/00* | (2006.01) |
| *B60K 35/22* | (2024.01) |
| *B60K 35/25* | (2024.01) |
| *B60K 35/26* | (2024.01) |

(52) U.S. Cl.
CPC ............... *B60Q 9/00* (2013.01); *B60K 35/00* (2013.01); *G06T 11/206* (2013.01); *H04R 3/00* (2013.01); *B60K 35/22* (2024.01); *B60K 35/25* (2024.01); *B60K 35/26* (2024.01)

(58) Field of Classification Search
CPC ............. B60W 50/16; B60W 2720/26; B60W 2720/263; B60W 2720/266; B60W 2520/26; B60W 2520/263; B60W 2520/266; B60K 35/00; B60K 35/21; B60K 35/22; B60K 35/233; B60K 35/25; B60K 35/26; B60Q 9/00; H04R 3/00; H04R 2499/13; G06T 11/206
See application file for complete search history.

(56) References Cited

U.S. PATENT DOCUMENTS

| | | | |
|---|---|---|---|
| 4,086,563 A | * | 4/1978 | Bachman ............... B60T 8/1708 340/439 |
| 5,220,307 A | * | 6/1993 | May .................... B60R 16/0237 340/439 |
| 6,352,318 B1 | | 3/2002 | Hosomi et al. |
| 7,091,839 B2 | | 8/2006 | Situ et al. |
| 10,343,525 B2 | | 7/2019 | Lian et al. |
| 11,467,575 B2 | | 10/2022 | Kapinski et al. |

(Continued)

FOREIGN PATENT DOCUMENTS

KR    20170122851 A    11/2017

*Primary Examiner* — Jason R Kurr
(74) *Attorney, Agent, or Firm* — David Kelley; McCoy Russell LLP

(57) ABSTRACT

Methods and systems are presented for generating visual and audible aids for a human that is driving a vehicle. In one example, a visual indication is provided during conditions when a wheel speed exceeds a vehicle reference speed by more than a threshold speed. In another example, an audible indication is provided during conditions when a vehicle speed exceeds a vehicle reference speed by more than a threshold speed.

20 Claims, 6 Drawing Sheets

(56) References Cited

U.S. PATENT DOCUMENTS

| | | | |
|---|---|---|---|
| 2010/0217491 A1* | 8/2010 | Naito | B60G 7/006 |
| | | | 701/49 |
| 2015/0105951 A1 | 4/2015 | Yu et al. | |
| 2017/0282790 A1* | 10/2017 | Pan | B60T 17/22 |
| 2018/0222459 A1 | 8/2018 | Kelly et al. | |
| 2020/0290596 A1* | 9/2020 | Birch | B60W 10/02 |
| 2020/0307618 A1* | 10/2020 | Yoshizawa | B60W 50/14 |
| 2020/0409359 A1 | 12/2020 | Kapinski et al. | |
| 2025/0111710 A1* | 4/2025 | Sawada | G07C 5/02 |

* cited by examiner

ELECTRIC VEHICLE DRIVING AID METHOD AND SYSTEM

TECHNICAL FIELD

The present description relates generally to methods and systems for providing a driving aid to a human that is driving a vehicle. The methods and systems may be particularly useful during conditions when wheel speed may deviate from vehicle speed.

BACKGROUND/SUMMARY

An electric vehicle may be significantly quieter than a vehicle that includes an internal combustion engine, especially at higher engine loads. While a quieter vehicle may be desirable during a lot of conditions, there may be conditions when quieter is not necessarily as desirable. For example, if a vehicle is traveling on a road with a low mu surface or off road, it may be helpful to a human driver to be able to hear the vehicle's engine. In particular, the vehicle's engine increasing in speed and noise output level may be indicative of lost traction. The human driver may use the engine's noise level as feedback for controlling engine torque so that wheel slip may be avoided or lowered, especially during circumstances where the human driver wants to keep eyes on the road. Additionally, whether or not a human driver has sound feedback from the vehicle's internal combustion engine, the human driver may desire additional vehicle information when traction is reduced so that the human driver has an opportunity to adjust vehicle operation.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
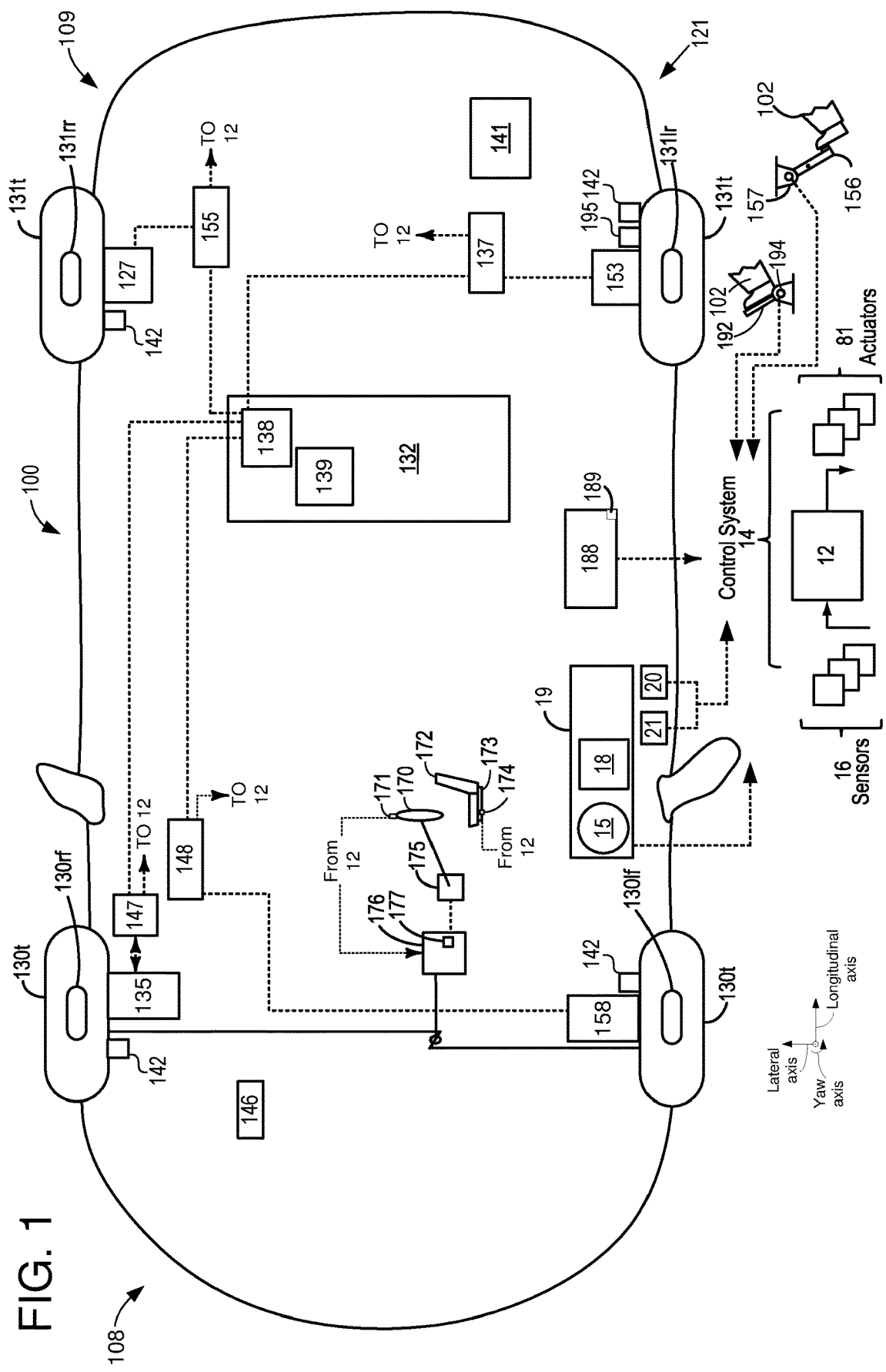
FIG. 1 is a schematic diagram of an example vehicle driveline.
Figure 3:
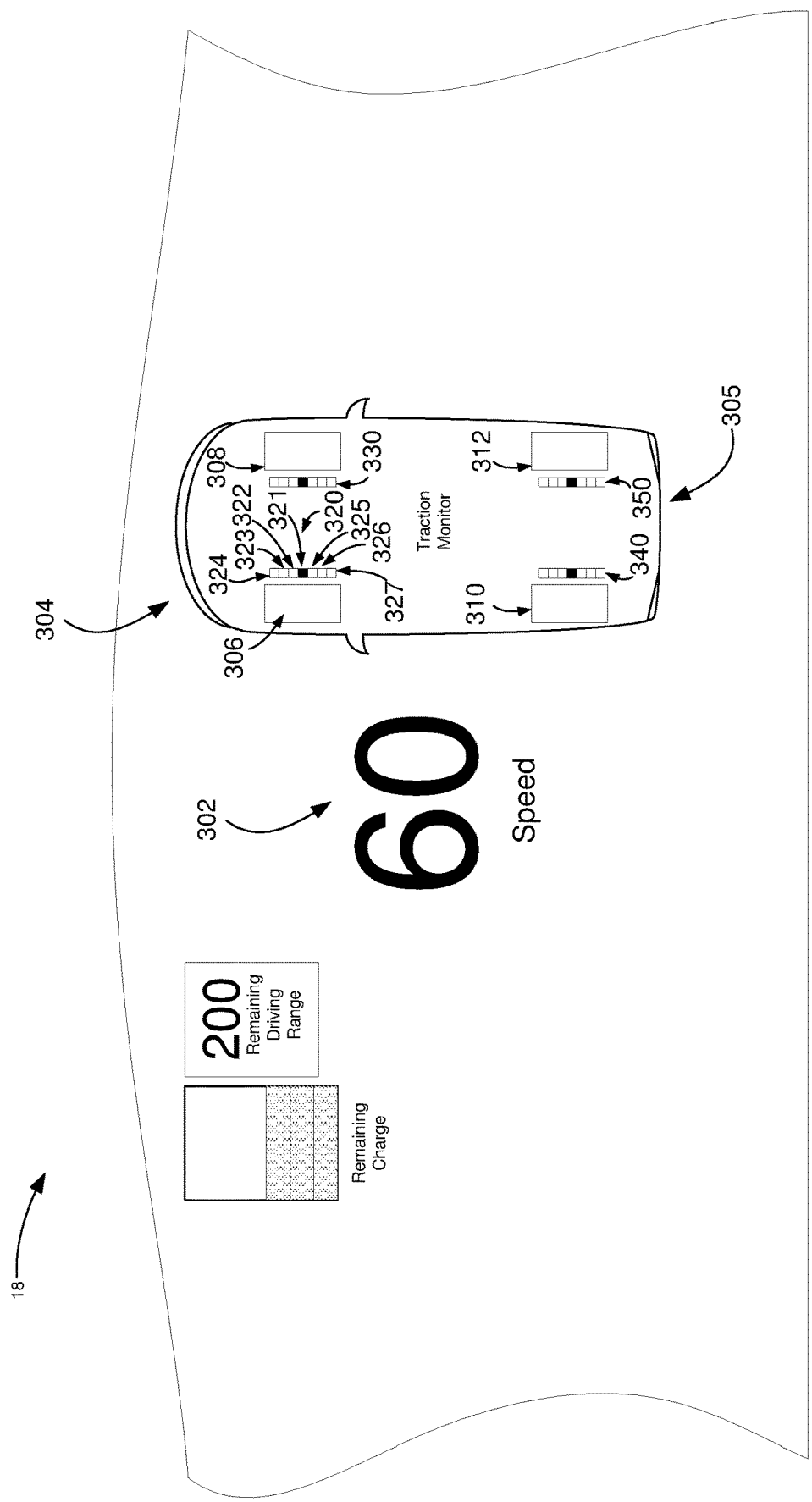
FIG. 3 shows a view of a display of an example instrument panel of a vehicle.
Figure 4:
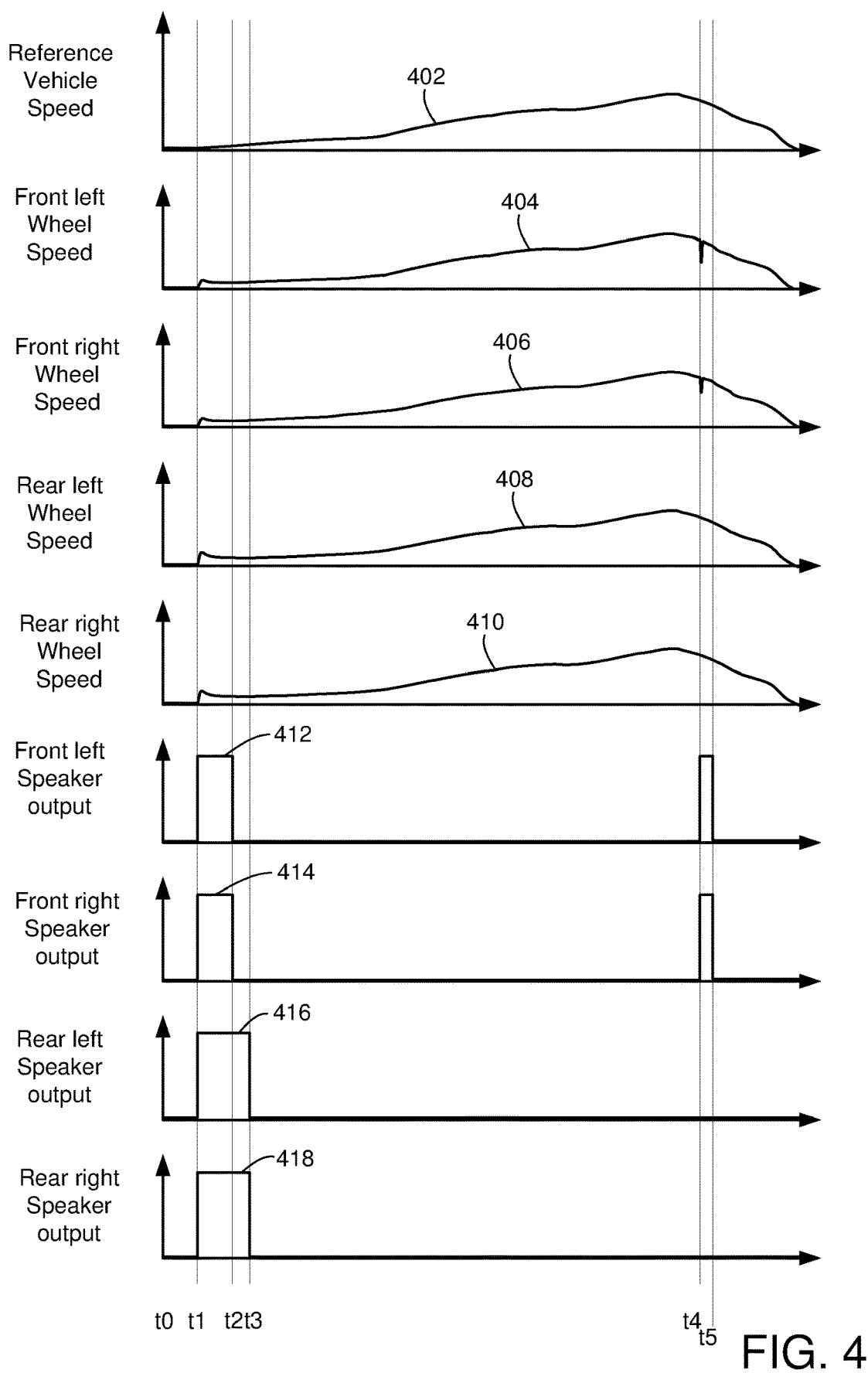
FIG. 4 shows an example vehicle operating sequence according to the method of FIGS. 5 and 6.
Figure 5:
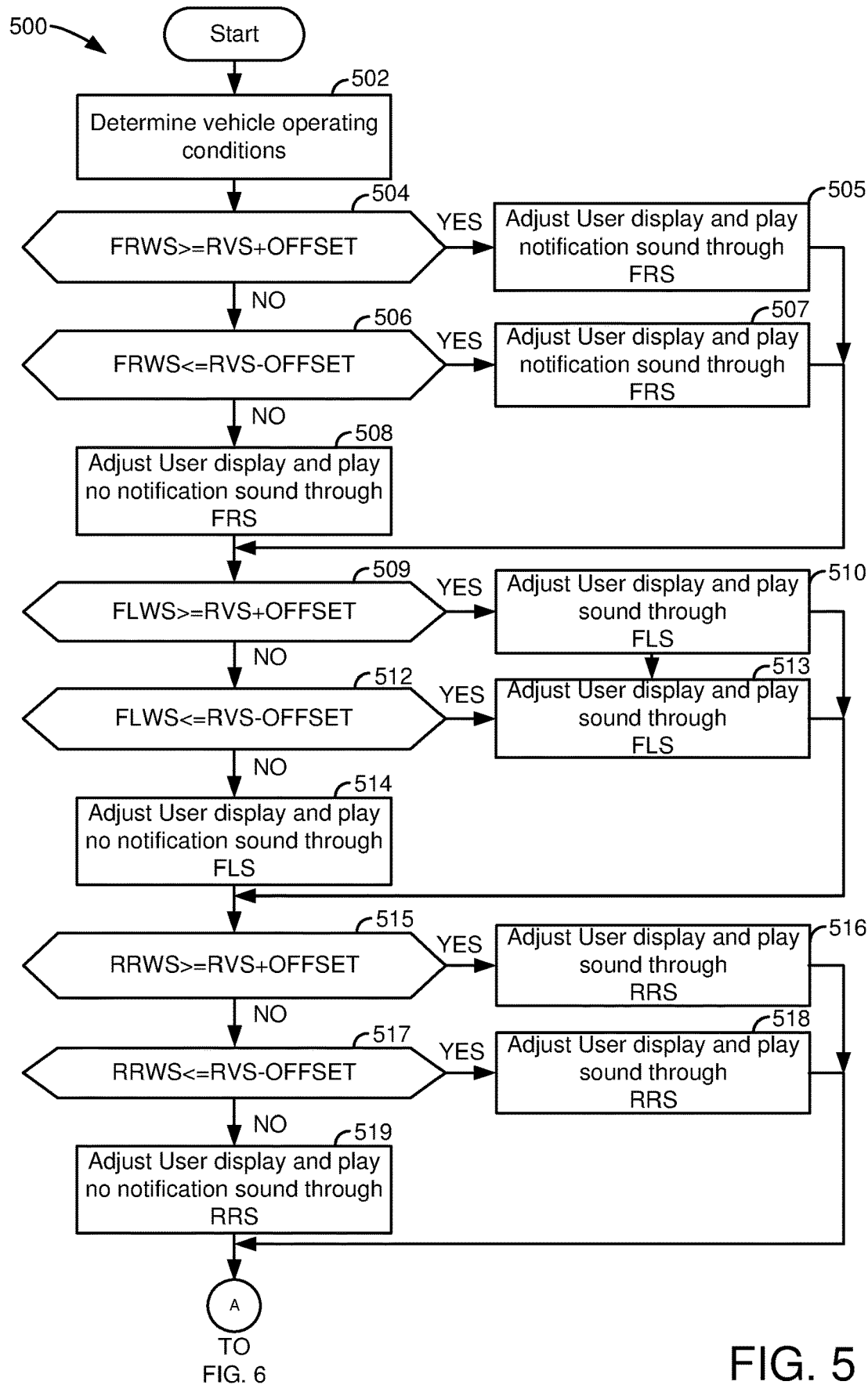
FIGS. 5 and 6 show a flowchart of an example method for operating a vehicle.
Figure 6:
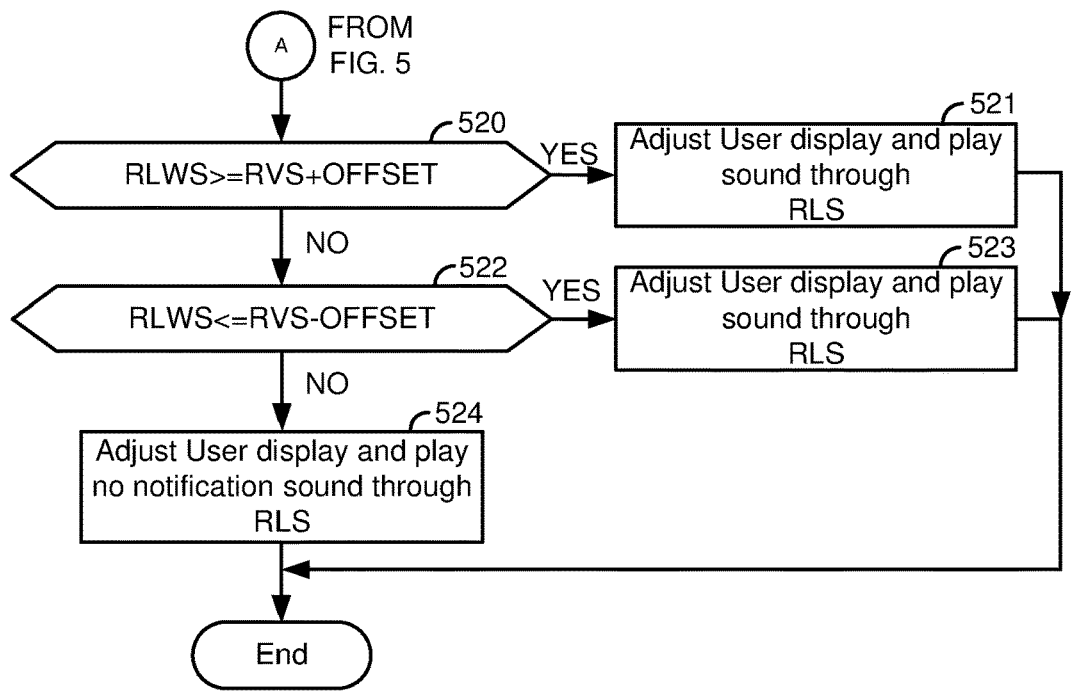

The following description relates to systems and methods for operating a vehicle. FIG. 1 shows an example vehicle configuration that may be controlled according to the method of FIGS. 5 and 6. An example vehicle sound system that may be operated according to the method of FIGS. 5 and 6 is shown in FIG. 3. An example vehicle display that may be operated according to the method of FIGS. 5 and 6 is shown in FIG. 4. An example vehicle operating sequence is shown in FIG. 4. Finally, a flowchart of a method for operating a vehicle is shown in FIGS. 5 and 6.

Like a conventional vehicle that has an internal combustion engine, an electric vehicle may be driven during conditions when roads or driving surfaces have a low mu (e.g., coefficient of friction). If a vehicle's human driver requests a larger torque or power amount, the vehicle's wheels may be prone to slip with respect to the driving surface. But, because electric machines are quiet, a human driver may not recognize that wheel slip is present due to a lack of internal combustion engine noise. This may allow the human driver to take mitigating actions, such as changing steering angle and/or moving a steering angle back and forth to improve traction and/or move debris that may be near the front wheels. Further, even if the human driver recognizes that wheel slip may be present, the human driver may not be able to distinguish which wheel is slipping. Therefore, the human driver may not be able to make an informed decision to institute mitigating actions so that the vehicle may proceed to its destination.

The inventors herein have recognized the above-mentioned issues and have developed a method for a vehicle, comprising: adjusting output of a first speaker via one or more controllers in response to a speed of a first wheel being greater than or equal to a reference vehicle speed plus a first offset speed or less than or equal to the reference speed minus a second offset speed.

By adjusting output of a speaker in response to a wheel speed being greater or equal to a reference vehicle speed plus a first offset speed or less than or equal to the reference speed minus a second offset speed, it may be possible to provide the technical result providing notice of a loss of traction for an electric vehicle that does not include an internal combustion engine. In particular, a noise may be played through one or more speakers to indicate a loss of traction or wheel slip so that a human driver may be more inclined to notice loss of traction for an electric vehicle. Further, a speaker that is selected to play the noise may be a speaker that is physically closest to a wheel that is experiencing a loss of traction so that notice of loss of traction for a particular wheel may be provided to a human driver.

The present description may provide several advantages. In particular, the approach may help a human to control a vehicle that is experiencing a loss of traction. Further, the approach may identify a specific wheel that is experiencing lower traction so that mitigating actions may be targeted to the wheel that is experiencing the lower traction. In addition, the approach may provide visual indications for loss of traction for each vehicle wheel.

FIG. 1 illustrates an example vehicle propulsion system 100 for vehicle 121. In this example, vehicle propulsion system 100 includes four electric machines that may be applied to propel vehicle 121. However, it should be appreciated that the present method and system is not limited to vehicles with four electric machines. Rather, the approach may be applied to vehicles with two or three electric machine propulsion sources. Additionally, the approach may be applied to hybrid vehicles that include electric machines and an internal combustion engine.

In this example, vehicle propulsion system 100 includes a first electric machine 153 that is coupled to solely one wheel, namely left rear wheel 131*lr*. Vehicle propulsion system 100 also includes a second electric machine 127 that is coupled to solely one wheel, namely right rear wheel 131*rr*. Vehicle propulsion system includes a third electric machine 135 that is coupled solely to right front wheel 130*rf*. Vehicle propulsion system also includes a fourth electric machine 158 that is coupled solely to left front wheel 130*fl*. Thus, each wheel of vehicle propulsion system 100 may be driven individually by an electric machine such that there is individual control of each wheel.

A first inverter system controller 137 may convert alternating current generated by first electric machine 153 to direct current for storage at the electric energy storage device 132 and vice versa. Second inverter system controller 155 may convert alternating current generated by second electric machine 153 to direct current for storage at the electric energy storage device 132 and vice versa. Third inverter system controller 147 may convert alternating current generated by third electric machine 135 to direct current for storage at the electric energy storage device 132 and vice versa. Fourth inverter system controller 148 may convert alternating current generated by fourth electric machine 158 to direct current for storage at the electric energy storage device 132 and vice versa.

Throughout the description of FIG. 1, mechanical connections between various components are illustrated as solid lines, whereas electrical connections between various components are illustrated as dashed lines.

Electric machine 135, electric machine 127, electric machine 158, and electric machine 153 are controlled via controller 12. The controller 12 (e.g., a centralized integrated vehicle control module) receives signals from the various sensors shown in FIG. 1. In addition, controller 12 employs the actuators shown in FIG. 1 to adjust driveline operation based on the received signals and instructions stored in memory of controller 12. Controller 12 may also communicate with sound system 188. Sound system 188 may include its own controller 189 that controls output of speakers (not shown) and communicates with controller 12.

Electric energy storage device 132 may be a battery, capacitor, inductor, or other electric energy storage device. In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 135, electric machine 153, electric machine 127, electric machine 158, electric energy storage device 132, etc. Control system 14 may receive sensory feedback information from one or more of electric machine 135, electric machine 127, electric machine 153, electric machine 158, electric energy storage device 132, etc. Further, control system 14 may send control signals to one or more of electric machine 135, electric machine 127, electric machine 153, electric machine 158, electric energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Control system 14 may identify and/or control the amount of electrical energy stored at the energy storage device, which may be referred to as the state of charge (SOC). Electric energy storage device 132 includes an electric energy storage device controller 139. Electric energy storage device controller 139 may provide charge balancing between energy storage element (e.g., battery cells) and communication with other vehicle controllers (e.g., controller 12).

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21. Vehicle propulsion system 100 may also include a steering control system 176 that may adjust a steering angle via adjusting a position of steering motor 177.

Vehicle propulsion system 100 may further include a brake system control module (BSCM) 141 to apply and release friction wheel brakes 142. In some examples, BSCM 141 may comprise an anti-lock braking system, such that tires (e.g., 130*t* and 131*t*) of wheels (e.g. 130*lf*, 130*rf*, 131*lr*, and 131*rr*) may maintain tractive contact with the road surface according to driver inputs while braking, which may thus prevent the wheels from locking up, to prevent skidding. In some examples, BSCM 141 may receive input from wheel speed sensors 195.

Vehicle propulsion system 100 may further include a motor electronics coolant pump (MECP) 146. MECP 146 may be used to circulate coolant to diffuse heat generated by at least electric machine 127, electric machine 153, and electric machine 135 of vehicle propulsion system 100, and the electronics system. MECP may receive electrical power from onboard electric energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, inertial sensors 199, etc. In some examples, steering angle sensor 175, sensors associated with electric machine 135, electric machine 158, electric machine 127, and electric machine 153, etc., may communicate information to controller 12, regarding various states of electric machine operation. Controller 12 may also provide tactile feedback via haptic steering wheel device 171 and haptic seat device 174. Steering wheel 170 may vibrate via haptic steering wheel device 171 and seat 172 may vibrate via haptic seat device 174. Haptic seat device 174 may be coupled to seat rail 173.

Dashboard 19 may include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135, electric machine 158, electric machine 127, and electric machine 153) based on an operator input. The operator interface 15 may receive input to activate electric machines 135, 127, 158, and 153, or shut down the electric machines 135, 127, 158, and 153 to turn off the vehicle.

It should be appreciated that the present disclosure is applicable to systems other than the system shown in FIG. 1. For example, the present disclosure may be applied to electric vehicles that include solely one electric machine as a propulsion source, electric vehicles that include a total of two electric machine propulsion sources, electric vehicles that include a total of three electric machine propulsion sources, and electric vehicles that include a total of four electric machine propulsion sources. In addition, the electric machine propulsion sources may be applied in different configurations. For example, some electric machine propulsion sources may be coupled to half shafts of an axle while other electric machine propulsion sources may be directly coupled to wheels and absent an axle. Further, some electric propulsion sources may drive a single wheel, while in other examples; an electric machine propulsion source may drive two or more wheels via an axle and/or transfer case. Additionally, the system may include an internal combustion engine.

The system of FIG. 1 provides for a vehicle system, comprising: a visual display; an audible sound system; a controller including executable instructions stored in non-transitory memory that cause the controller to adjust one of the visual display and the audible sound system in response to a speed of a first wheel being greater than or equal to a reference vehicle speed plus a first offset speed or less than or equal to the reference speed minus a second offset speed. In a first example, the vehicle system includes wherein adjusting one of the visual display and the audible sound system includes adjusting segments of a bar graph of the visual display. In a second example that may include the first example, the vehicle system includes wherein adjusting one of the visual display and the audible sound system includes adjusting output of an array of speakers. In a third example that may include one or both of the first and second examples, the vehicle system includes wherein adjusting output of the array of speakers includes playing a sound through a speaker that is physically closest to a slipping wheel. In a fourth example that may include one or more of the first through third examples, the vehicle system includes where the speed of the first wheel is greater than or equal to the reference vehicle speed plus the first offset speed in response to a driver demand pedal being applied. In a fifth example that may include one or more of the first through fourth examples, the vehicle system includes where the speed of the first wheel is less than or equal to the reference vehicle speed minus the second offset speed in response to a brake pedal being applied.

Figure 2:
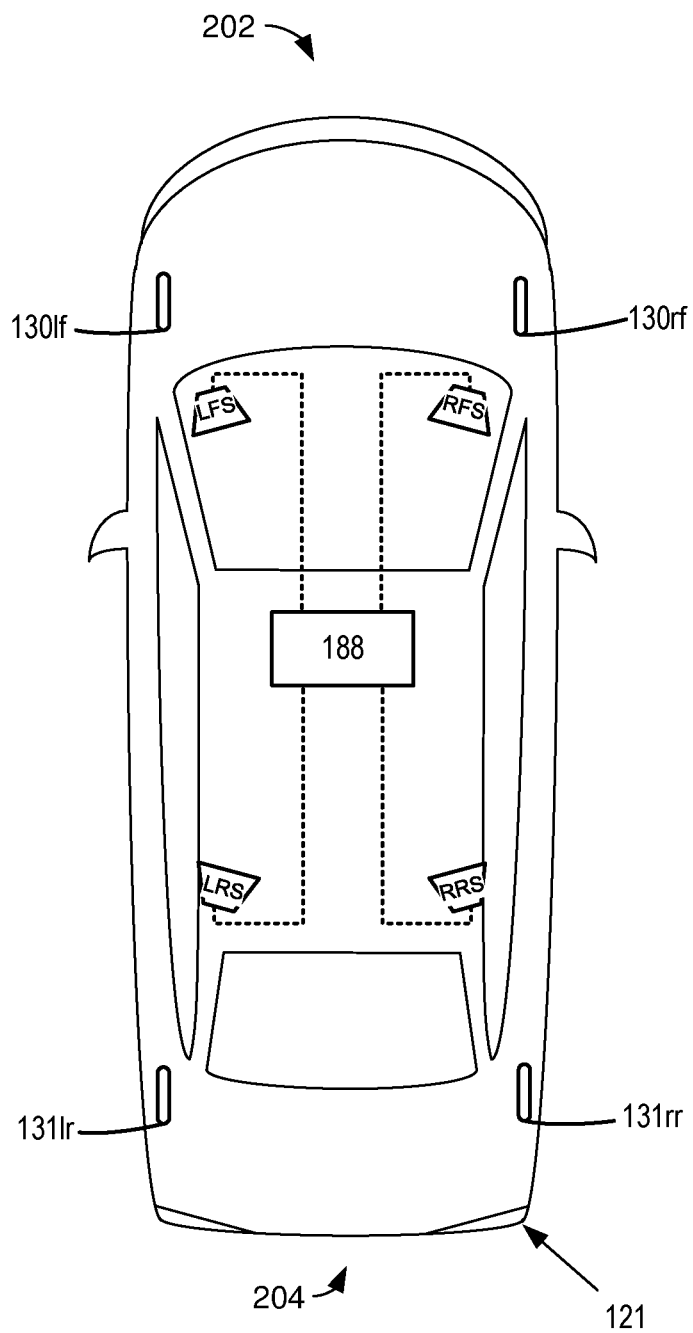
FIG. 2 is a schematic diagram of a sound system of a vehicle.

Referring now to FIG. 2, a schematic diagram of a sound system of a vehicle is shown. In this example, vehicle 121 includes four speakers. The vehicle sound system may be operated according to the method of FIGS. 5 and 6.

The front side 202 of vehicle 121 includes a right front wheel 130rf and a left front wheel 130lf. Vehicle 121 also includes a right front speaker RFS and a left front speaker LFS. The rear side 204 of vehicle 121 includes a right rear wheel 130rr and a left rear wheel 130lr. Vehicle 121 also includes a right rear speaker RRS and a left rear speaker LRS.

According to the method of FIGS. 5 and 6, sound system 188 may play a sound through left front speaker LFS in response to a speed of left front wheel 130lf being greater than a vehicle reference speed plus an offset vehicle speed or the speed of left front wheel 130lf being less than the vehicle reference speed minus an offset vehicle speed. The sound system 188 may play a sound of a slipping wheel, a revving engine, or other known sound. In addition, sound system 188 may interrupt playing of a song through speaker LFS in response to the aforementioned conditions being present. Interrupting playing of the song may include stopping playing of the song or playing the song while the other sound (e.g., wheel slipping, etc.) is played through the LFS speaker. Similarly, sound system 188 may play a sound through right front speaker RFS in response to a speed of right front wheel 130rf being greater than a vehicle reference speed plus an offset vehicle speed or the speed of right front wheel 130rf being less than the vehicle reference speed minus an offset vehicle speed. The sound system 188 may play a sound of a slipping wheel, a revving engine, or other known sound. In addition, sound system 188 may interrupt playing of a song through speaker RFS in response to the aforementioned conditions being present. Interrupting playing of the song may include stopping playing of the song or playing the song while the other sound (e.g., wheel slipping, etc.) is played through the RFS speaker. Right rear speaker RRS and left rear speaker LRS may be operated in a similar way.

Thus, speakers RFS, LFS, RRS, and LRS may be operated to directionally signal to the vehicle's human driver that one or more wheels are receiving or transferring more or less torque or power than may be desired such that wheel slip may be generated during conditions when driver demand may be requesting wheel torque or power, or when braking demand may be requesting generation wheel torque or power. For example, if greater than a threshold amount of wheel slip is detected for front wheel 130lf, a particular sound may be played through left from speaker LFS so that the speaker that is physically closest to the slipping wheel may be identified by the human driver hearing the particular sound being played through the speaker that is physically closest to the slipping wheel.

Referring now to FIG. 3, a view of a display system 18 of an example dash board of a vehicle is shown. Display system 18 includes an indication of vehicle speed 302 and a vehicle traction monitor 304. The vehicle traction monitor 304 includes an image of the vehicle 305. The image of the vehicle 305 includes four wheels 306-312 and four bar graphs 320, 330, 340, and 350, one bar graph for each wheel. Bar graph 320 is associated with wheel 306. Likewise, bar graphs 330, 340, and 350 are associated with wheels 308, 310, and 312.

In this example, each of bar graphs 320, 330, 340, and 350 are constructed in a similar way. Therefore, for the sake of brevity, this disclosure will describe only the construction of bar graph 320, the description also applied to bar graphs 330, 340, and 350.

Bar graph 320 may comprised of a plurality of light emitting diode segments (LED) or display pixels 321-327 (liquid crystal display pixels or other known types of display elements), referred to herein as LEDs for simplicity. LED segment 321 is lit (e.g., shown as colored in black) to indicate that the left front wheel speed is not greater than the reference vehicle speed plus a first offset vehicle speed or lower than the reference vehicle speed minus a second offset vehicle speed. If the left front wheel speed is greater than the reference vehicle speed plus a first offset vehicle speed, then one or more of LED segments 322-324 may be lit to indicate the extent of how much the left wheel speed is greater than the vehicle speed plus the first offset speed. The greater the left wheel speed is relative to the reference vehicle speed plus the first offset speed, the greater number of LED segments 322-324 are lit. On the other hand, if the left front wheel speed is less than the reference vehicle speed minus a second offset vehicle speed, then one or more of LED segments 325-327 may be lit to indicate the extent of how much the left wheel speed is less than the vehicle speed minus the second offset speed. The less the left wheel speed is relative to the reference vehicle speed minus the second offset speed, the greater number of LED segments 325-327 are lit. Thus, LED segments 322-324 may be lit when a driver demand pedal is applied and LED segments 325-327 may be lit when a brake pedal is applied. The different LED segments may be colored differently so as to allow the user (e.g., human) to more easily differentiate between the various operating states. For example, LED segment 321 may be colored green, LEDs above segment 321 may be colored white, and LEDs below segment 321 may be colored yellow.

Instead of bar graphs, display system 18 may provide numerical values for each wheel. For example, if the left front wheel speed is greater than the reference vehicle speed plus a first offset vehicle speed, then a numerical display for the left front wheel may indicate how much greater the left wheel speed is than the reference vehicle speed plus the first offset speed.

In this way, the vehicle traction monitor 304 may provide visual feedback to a human driver when wheel slip may be detected. The vehicle traction monitor 304 provides output for each driven wheel so that a vehicle's driver may distinguish which if any wheel may be slipping. Moving on to FIG. 4, an example vehicle operating sequence according to the method of FIGS. 5 and 6 is shown. The operating sequence of FIG. 4 may be provided via the system of FIG. 1 in cooperation with the method of FIGS. 5 and 6. The vertical lines at times t0-t5 represent times of interest during the sequence.

The first plot from the top of FIG. 4 is a plot of a vehicle reference speed versus time. The vertical axis represents reference vehicle speed and reference vehicle speed increases in the direction of the vertical axis arrow. The horizontal axis represents time and time increases from the left side of the plot to the right side of the plot. The vehicle reference speed may be determined as known in the art including but not limited to global positioning system and/or a combination of wheel speed sensor outputs. Trace 402 represents the reference vehicle speed.

The second plot from the top of FIG. 4 is a plot of a front left wheel speed versus time. The vertical axis represents front left wheel speed and front left wheel speed increases in the direction of the vertical axis arrow. The horizontal axis represents time and time increases from the left side of the plot to the right side of the plot. The front left wheel speed may be determined via a wheel speed sensor. Trace 404 represents the front left wheel speed.

The third plot from the top of FIG. 4 is a plot of a front right wheel speed versus time. The vertical axis represents front right wheel speed and front right wheel speed increases in the direction of the vertical axis arrow. The horizontal axis represents time and time increases from the left side of the plot to the right side of the plot. The front right wheel speed may be determined via a wheel speed sensor. Trace 406 represents the front right wheel speed.

The fourth plot from the top of FIG. 4 is a plot of a rear left wheel speed versus time. The vertical axis represents rear left wheel speed and rear left wheel speed increases in the direction of the vertical axis arrow. The horizontal axis represents time and time increases from the left side of the plot to the right side of the plot. The rear left wheel speed may be determined via a wheel speed sensor. Trace 408 represents the rear left wheel speed.

The fifth plot from the top of FIG. 4 is a plot of a rear right wheel speed versus time. The vertical axis represents rear right wheel speed and rear right wheel speed increases in the direction of the vertical axis arrow. The horizontal axis represents time and time increases from the left side of the plot to the right side of the plot. The rear right wheel speed may be determined via a wheel speed sensor. Trace 410 represents the rear right wheel speed.

The sixth plot from the top of FIG. 4 is a plot of a front left speaker output versus time. The vertical axis represents front left speaker output and front left speaker output increases in the direction of the vertical axis arrow. The horizontal axis represents time and time increases from the left side of the plot to the right side of the plot. Trace 412 represents the front left speaker output.

The seventh plot from the top of FIG. 4 is a plot of a front right speaker output versus time. The vertical axis represents front right speaker output and front right speaker output increases in the direction of the vertical axis arrow. The horizontal axis represents time and time increases from the left side of the plot to the right side of the plot. Trace 414 represents the front right speaker output.

The eighth plot from the top of FIG. 4 is a plot of a rear left speaker output versus time. The vertical axis represents rear left speaker output and rear left speaker output increases in the direction of the vertical axis arrow. The horizontal axis represents time and time increases from the left side of the plot to the right side of the plot. Trace 416 represents the rear left speaker output.

The ninth plot from the top of FIG. 4 is a plot of a rear right speaker output versus time. The vertical axis represents rear right speaker output and rear right speaker output increases in the direction of the vertical axis arrow. The horizontal axis represents time and time increases from the left side of the plot to the right side of the plot. Trace 418 represents the rear right speaker output.

At time t0, the vehicle reference speed is zero and the wheel speeds are zero. The speakers output is zero.

At time t1, a driver applies a driver demand pedal (not shown), which causes torque to be delivered to each wheel via an electric machine (not shown). The torque causes the front wheel speeds and the rear wheel speeds to increase. The vehicle is driving on a low mu surface (not shown) so that wheel speeds exceed the reference vehicle speed by more than an offset speed. As a result, sound is output to all four speakers.

At time t2, speeds of the front wheels fall below the reference vehicle speed plus the offset vehicle speed, which causes the sound through the front speakers which is based on wheel speed to cease. The speeds of the rear wheels remain above the reference vehicle speed plus the offset vehicle speed. Therefore, the rear speakers remain activated and sound continues to be played though these speakers.

At time t3, the speeds of the front wheels are nearly equal to the reference vehicle speed. Therefore, the sound through the front speakers that is based on wheel speed remains off. The speeds of the rear wheels fall below the reference vehicle speed plus the offset vehicle speed. Therefore, the sound that is based on wheel speed is no longer played though the rear speakers.

Between time t3 and time t4, the wheel speeds and the reference vehicle speed increase and eventually begin to decrease. No sound that is related to wheel speed is played through the speakers. Vehicle braking is requested shortly before time t4 and electric machines provide regenerative braking (not shown).

At time t4, the electric machines at the front of the vehicle slow the wheels that they are coupled to down to speeds that are less than the reference vehicle speed minus an offset speed. Therefore, sounds related to wheel speed are played through the front speakers. The electric machines at the rear of the vehicle rotate near the reference vehicle speed. Therefore, sounds related to wheel speed are not played through the rear speakers. Shortly after time t4, the regenerative braking that is provided by the front electric machines is reduced so that the speeds of the front wheels are close to the reference vehicle speed. In this example, the sounds continue to play through the front speakers for a predetermined amount of time and then the sound ceases to be played through the front speakers at time t5.

In this way, sounds that are played through vehicle speakers may be adjusted to provide an indication of which wheel speeds may be deviating from a vehicle reference speed by more than a predetermined offset amount of speed. The vehicle's human driver may then adjust braking demand or driver demand to achieve desired vehicle operation. This way of operating may be especially beneficial if the vehicle is operating off road or on slippery surfaces where the human driver prefers to have a higher level of vehicle control.

Referring now to FIGS. 5 and 6, an example method for operating a vehicle (e.g., an electric vehicle) is shown. The method of FIGS. 5 and 6 may be incorporated into and may cooperate with the system of FIG. 1. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include, but are not limited to wheel speeds and reference vehicle speed. Method 500 proceeds to 504.

At 504, method 500 judges whether or not front right wheel speed (FRWS) is greater than or equal to reference vehicle speed (RVS) plus a first offset vehicle speed. If so, the answer is yes and method 500 proceeds to 505. Otherwise, the answer is no and method 500 proceeds to 506.

At 505, method 500 adjusts output of a vehicle display and/or sound output of a front right speaker (FRS). In one example, method 500 lights one or more segments of a bar graph to indicate that FRWS is greater than or equal to RVS plus an offset speed. Further, method 500 may adjust an actual total number of LEDs that are lit based on the following equation:

$$\text{LED\_seg} = FRWS - RVS + \text{offset}$$

If the value of LED_seg is greater than a first predetermined value, a first LED segment is lit, if the value of LED_seg is greater than a second predetermined value, the first LED segment and a second LED segment are lit, if the value of LED_seg is greater than a third predetermined value, the first LED segment, second LED segment, and a third LED segment are lit. Alternatively, the numerical value of LED_seg may be displayed to a human driver.

Method 500 may also adjust output of a speaker in response to the FRWS being greater than or equal to RVS plus a first offset speed. In particular, method 500 may adjust output of a front right speaker (FRS). In one example, method 500 may begin to play a first sound through the FRS based on the FRWS. The first sound may be played via a sound system is coupled to the FRS. If the first sound system is playing a song or other sounds at the time that the sound based on FRS is played, the sound system may stop playing the song that is being played or reduce the volume of the sound or song that is being played. Method 500 proceeds to 509. At 506, method 500 judges whether or not front right wheel speed (FRWS) is less than or equal to reference vehicle speed (RVS) minus a second offset vehicle speed. If so, the answer is yes and method 500 proceeds to 507. Otherwise, the answer is no and method 500 proceeds to 508.

At 507, method 500 adjusts output of a vehicle display and/or sound output of a front right speaker (FRS). In one example, method 500 lights one or more segments of a bar graph to indicate that FRWS is less than or equal to RVS minus a second offset speed. Further, method 500 may adjust an actual total number of LEDs that are lit based on the following equation:

$$\text{LED\_seg} = FRWS - RVS - \text{offset}$$

If the value of LED_seg is less than a first predetermined value, a first LED segment is lit, if the value of LED_seg is less than a second predetermined value, the first LED and a second LED segments are lit, if the value of LED_seg is less than a third predetermined value, the first LED segment, second LED segment, and a third LED segment are lit. Alternatively, the value of LED_seg may be displayed to a human driver.

Method 500 may also adjust output of a speaker in response to the FRWS being less than or equal to RVS minus a second offset speed, the second offset speed may be different from the first offset speed. In particular, method 500 may adjust output of a front right speaker (FRS). In one example, method 500 may begin to play a second sound through the FRS based on the FRWS. The second sound may be played via a sound system that is coupled to the FRS. If the sound system is playing a song or other sounds at the time that the second sound based on FRS is played, the sound system may stop playing the song or reduce the volume of the sound or song. Method 500 proceeds to 509.

At 508, method 500 adjusts output of a vehicle display and/or sound output of a front right speaker (FRS). In one example, method 500 lights one segment of a bar graph to indicate that FRWS is not greater than or equal to RVS plus a first offset speed and FRWS is not less than or equal to RVS minus a second offset speed Method 500 may also adjust output of a speaker in response to the FRWS not being greater than or equal to RVS plus a first offset speed and FRWS not being less than or equal to RVS minus a second offset speed. In particular, method 500 may adjust output of a front right speaker (FRS). In one example, method 500 may stop playing the first sound or the second sound through the FRS based on the FRWS. In some examples, method 500 may wait a predetermined amount of time before stopping playing of the first sound or the second sound so that perception of the sounds may be improved. Method 500 proceeds to 509.

At 509, method 500 judges whether or not front left wheel speed (FLWS) is greater than or equal to reference vehicle speed (RVS) plus a first offset vehicle speed. If so, the answer is yes and method 500 proceeds to 510. Otherwise, the answer is no and method 500 proceeds to 512.

At 510, method 500 adjusts output of a vehicle display and/or sound output of a front left speaker (FLS). In one example, method 500 lights one or more segments of a bar graph to indicate that FLWS is greater than or equal to RVS plus an offset speed. Further, method 500 may adjust an actual total number of LEDs that are lit based on the following equation:

$$\text{LED\_seg} = FLWS - RVS + \text{offset}$$

If the value of LED_seg is greater than a first predetermined value, a first LED segment is lit, if the value of LED_seg is greater than a second predetermined value, the first LED and a second LED segments are lit, if the value of LED_seg is greater than a third predetermined value, the first LED segment, second LED segment, and a third LED segment are lit. Alternatively, the value of LED_seg may be displayed to a human driver.

Method 500 may also adjust output of a speaker in response to the FLWS being greater than or equal to RVS plus a first offset speed. In particular, method 500 may adjust output of a front left speaker (FLS). In one example, method 500 may begin to play a first sound through the FLS based on the FLWS. The first sound may be played via a sound system is coupled to the FLS. If the first sound system is playing a song or other sounds at the time that the sound based on FLS is played, the sound system may stop playing the song that is being played or reduce the volume of the sound or song that is being played. Method 500 proceeds to 515.

At 512, method 500 judges whether or not front left wheel speed (FLWS) is less than or equal to reference vehicle speed (RVS) minus a second offset vehicle speed. If so, the answer is yes and method 500 proceeds to 513. Otherwise, the answer is no and method 500 proceeds to 514.

At 513, method 500 adjusts output of a vehicle display and/or sound output of a front left speaker (FLS). In one example, method 500 lights one or more segments of a bar graph to indicate that FLWS is less than or equal to RVS minus a second offset speed. Further, method 500 may adjust an actual total number of LEDs that are lit based on the following equation:

$$\text{LED\_seg} = FLWS - RVS - \text{offset}$$

If the value of LED_seg is less than a first predetermined value, a first LED segment is lit, if the value of LED_seg is less than a second predetermined value, the first LED and a second LED segments are lit, if the value of LED_seg is less than a third predetermined value, the first LED, second LED, and a third LEDs are lit. Alternatively, the value of LED_seg may be displayed to a human driver.

Method 500 may also adjust output of a speaker in response to the FLWS being less than or equal to RVS minus a second offset speed, the second offset speed may be different from the first offset speed. In particular, method 500 may adjust output of a front left speaker (FLS). In one example, method 500 may begin to play a second sound through the FLS based on the FLWS. The second sound may be played via a sound system that is coupled to the FLS. If the sound system is playing a song or other sounds at the time that the second sound based on FLS is played, the sound system may stop playing the song or reduce the volume of the sound or song. Method 500 proceeds to 515.

At 514, method 500 adjusts output of a vehicle display and/or sound output of a front left speaker (FLS). In one example, method 500 lights one segment of a bar graph to indicate that FLWS is not greater than or equal to RVS plus a first offset speed and FLWS is not less than or equal to RVS minus a second offset speed Method 500 may also adjust output of a speaker in response to the FLWS not being greater than or equal to RVS plus a first offset speed and FLWS not being less than or equal to RVS minus a second offset speed. In particular, method 500 may adjust output of a front left speaker (FLS). In one example, method 500 may stop playing the first sound or the second sound through the FLS based on the FLWS. In some examples, method 500 may wait a predetermined amount of time before stopping playing of the first sound or the second sound so that perception of the sounds may be improved. Method 500 proceeds to 515.

At 515, method 500 judges whether or not rear right wheel speed (RRWS) is greater than or equal to reference vehicle speed (RVS) plus a first offset vehicle speed. If so, the answer is yes and method 500 proceeds to 516. Otherwise, the answer is no and method 500 proceeds to 517.

At 516, method 500 adjusts output of a vehicle display and/or sound output of a rear right speaker (RRS). In one example, method 500 lights one or more segments of a bar graph to indicate that RRWS is greater than or equal to RVS plus an offset speed. Further, method 500 may adjust an actual total number of LEDs that are lit based on the following equation:

$$\text{LED\_seg} = RRWS - RVS + \text{offset}$$

If the value of LED_seg is greater than a first predetermined value, a first LED segment is lit, if the value of LED_seg is greater than a second predetermined value, the first LED and a second LED segments are lit, if the value of LED_seg is greater than a third predetermined value, the first LED segment, second LED segment, and a third LED segment are lit. Alternatively, the value of LED_seg may be displayed to a human driver.

Method 500 may also adjust output of a speaker in response to the RRWS being greater than or equal to RVS plus a first offset speed. In particular, method 500 may adjust output of a rear right speaker (RRS). In one example, method 500 may begin to play a first sound through the RRS based on the RRWS. The first sound may be played via a sound system is coupled to the RRS. If the first sound system is playing a song or other sounds at the time that the sound based on RRS is played, the sound system may stop playing the song that is being played or reduce the volume of the sound or song that is being played. Method 500 proceeds to 520.

At 517, method 500 judges whether or not rear right wheel speed (RRWS) is less than or equal to reference vehicle speed (RVS) minus a second offset vehicle speed. If so, the answer is yes and method 500 proceeds to 518. Otherwise, the answer is no and method 500 proceeds to 519.

At 518, method 500 adjusts output of a vehicle display and/or sound output of a rear right speaker (RRS). In one example, method 500 lights one or more segments of a bar graph to indicate that RRWS is less than or equal to RVS minus a second offset speed. Further, method 500 may adjust an actual total number of LEDs that are lit based on the following equation:

$$LED\_seg = RRWS - RVS - \text{offset}$$

If the value of LED_seg is less than a first predetermined value, a first LED segment is lit, if the value of LED_seg is less than a second predetermined value, the first LED and a second LED segments are lit, if the value of LED_seg is less than a third predetermined value, the first LED segment, second LED segment, and a third LED segment are lit. Alternatively, the value of LED_seg may be displayed to a human driver.

Method 500 may also adjust output of a speaker in response to the RRWS being less than or equal to RVS minus a second offset speed, the second offset speed may be different from the first offset speed. In particular, method 500 may adjust output of a rear right speaker (RRS). In one example, method 500 may begin to play a second sound through the RRS based on the RRWS. The second sound may be played via a sound system that is coupled to the RRS. If the sound system is playing a song or other sounds at the time that the second sound based on RRS is played, the sound system may stop playing the song or reduce the volume of the sound or song. Method 500 proceeds to 520.

At 519, method 500 adjusts output of a vehicle display and/or sound output of a rear right speaker (RRS). In one example, method 500 lights one segment of a bar graph to indicate that RRWS is not greater than or equal to RVS plus a first offset speed and RRWS is not less than or equal to RVS minus a second offset speed Method 500 may also adjust output of a speaker in response to the RRWS not being greater than or equal to RVS plus a first offset speed and RRWS not being less than or equal to RVS minus a second offset speed. In particular, method 500 may adjust output of a rear right speaker (RRS). In one example, method 500 may stop playing the first sound or the second sound through the RRS based on the RRWS. In some examples, method 500 may wait a predetermined amount of time before stopping playing of the first sound or the second sound so that perception of the sounds may be improved. Method 500 proceeds to 520.

At 520, method 500 judges whether or not rear left wheel speed (RLWS) is greater than or equal to reference vehicle speed (RVS) plus a first offset vehicle speed. If so, the answer is yes and method 500 proceeds to 521. Otherwise, the answer is no and method 500 proceeds to 522.

At 521, method 500 adjusts output of a vehicle display and/or sound output of a rear left speaker (RLS). In one example, method 500 lights one or more segments of a bar graph to indicate that RLWS is greater than or equal to RVS plus an offset speed. Further, method 500 may adjust an actual total number of LEDs that are lit based on the following equation:

$$LED\_seg = RLWS - RVS + \text{offset}$$

If the value of LED_seg is greater than a first predetermined value, a first LED segment is lit, if the value of LED_seg is greater than a second predetermined value, the first LED and a second LED segments are lit, if the value of LED_seg is greater than a third predetermined value, the first LED segment, second LED segment, and a third LED segment are lit. Alternatively, the value of LED_seg may be displayed to a human driver.

Method 500 may also adjust output of a speaker in response to the RLWS being greater than or equal to RVS plus a first offset speed. In particular, method 500 may adjust output of a rear left speaker (RLS). In one example, method 500 may begin to play a first sound through the RLS based on the RLWS. The first sound may be played via a sound system is coupled to the RLS. If the first sound system is playing a song or other sounds at the time that the sound based on RLS is played, the sound system may stop playing the song that is being played or reduce the volume of the sound or song that is being played. Method 500 proceeds to exit.

At 522, method 500 judges whether or not rear left wheel speed (RLWS) is less than or equal to reference vehicle speed (RVS) minus a second offset vehicle speed. If so, the answer is yes and method 500 proceeds to 523. Otherwise, the answer is no and method 500 proceeds to 524.

At 523, method 500 adjusts output of a vehicle display and/or sound output of a rear left speaker (RLS). In one example, method 500 lights one or more segments of a bar graph to indicate that RLWS is less than or equal to RVS minus a second offset speed. Further, method 500 may adjust an actual total number of LEDs that are lit based on the following equation:

$$LED\_seg = RLWS - RVS - \text{offset}$$

If the value of LED_seg is less than a first predetermined value, a first LED segment is lit, if the value of LED_seg is less than a second predetermined value, the first LED and a second LED segments are lit, if the value of LED_seg is less than a third predetermined value, the first LED segment, second LED segment, and a third LED segment are lit. Alternatively, the value of LED_seg may be displayed to a human driver.

Method 500 may also adjust output of a speaker in response to the RLWS being less than or equal to RVS minus a second offset speed, the second offset speed may be different from the first offset speed. In particular, method 500 may adjust output of a rear left speaker (RLS). In one example, method 500 may begin to play a second sound through the RLS based on the RLWS. The second sound may be played via a sound system that is coupled to the RLS. If the sound system is playing a song or other sounds at the time that the second sound based on RLS is played, the sound system may stop playing the song or reduce the volume of the sound or song. Method 500 proceeds to exit.

At 524, method 500 adjusts output of a vehicle display and/or sound output of a rear left speaker (RLS). In one example, method 500 lights one segment of a bar graph to indicate that RLWS is not greater than or equal to RVS plus a first offset speed and RLWS is not less than or equal to RVS minus a second offset speed Method 500 may also adjust output of a speaker in response to the RLWS not being greater than or equal to RVS plus a first offset speed and RLWS not being less than or equal to RVS minus a second offset speed. In particular, method 500 may adjust output of a rear left speaker (RLS). In one example, method 500 may stop playing the first sound or the second sound through the RLS based on the RLWS. In some examples, method 500 may wait a predetermined amount of time before stopping playing of the first sound or the second sound so that perception of the sounds may be improved. Method 500 proceeds to exit.

Although not mentioned explicitly above, it should be appreciated that one or more haptic devices may vibrate a vehicle component (e.g., a seat, pedal, steering wheel, etc.) to notify a vehicle operator (e.g., a human) that one or more wheels may be experiencing slip. For example, if the conditions for one or more of steps 505, 507, 510, 513, 516, 518, 521, and 523 are met, a haptic device may vibrate a vehicle component.

In this way, method 500 may adjust speaker output and/or a display in response to individual wheel speeds and a reference vehicle speed. Thus, a human driver may be alerted to wheel slip via audible or visual devices.

The method of FIGS. 5 and 6 provides for a method for a vehicle, comprising: adjusting output of a first speaker via one or more controllers in response to a speed of a first wheel being greater than or equal to a reference vehicle speed plus a first offset speed or less than or equal to the reference speed minus a second offset speed. In a first example, the method includes wherein the first speaker is a selected from a group of speakers. In a second example that may include the first example, the method includes wherein the first speaker in the group of speakers is physically closest to the first wheel as compared to other speakers in the group of speakers. In a third example that may include one or both of the first and second examples, the method includes wherein adjusting output of the first speaker includes increasing a sound output level as a difference between the reference speed and the speed of the first wheel increases. In a fourth example that may include one or more of the first through third examples, the method includes wherein adjusting output of the first speaker includes decreasing a sound output level as a difference between the reference speed and the speed of the first wheel decreases. In a fifth example that may include one or more of the first through fourth examples, the method further comprises adjusting output of a second speaker via the one or more controllers in response to a speed of a second wheel being greater than or equal to the reference vehicle speed plus the first offset speed and less than or equal to the reference speed minus the second offset speed. In a sixth example that may include one or more of the first through fifth examples, the method includes wherein the first wheel is on a front side of a vehicle and wherein the second wheel is on a rear side of the vehicle. In a seventh example that may include one or more of the first through sixth examples, the method includes wherein adjusting output of the first speaker includes playing a sound through the first speaker. In an eighth example that may include one or more of the first through seventh examples, the method includes wherein adjusting output of the first speaker includes interrupting playing of a second sound through the first speaker.

The method of FIGS. 5 and 6 also provides for a method for a vehicle, comprising: adjusting output of a device (e.g., a haptic device or visual display) via one or more controllers in response to a speed of a first wheel being greater than or equal to a reference vehicle speed plus a first offset speed or less than or equal to the reference speed minus a second offset speed. In a first example, the method includes wherein the visual display includes a bar graph. In a second example that may include the first example, the method includes wherein the speed of the first wheel is greater than or equal to the reference vehicle speed when a driver demand pedal is applied. In a third example that may include one or both of the first and second examples, the method includes wherein the speed of the first wheel is less than or equal to the reference vehicle speed when a brake pedal is applied. In a fourth example that may include one or more of the first through third examples, the method further comprises displaying a base image via the visual display in response to the speed of the first wheel not being greater than or equal to a reference vehicle speed plus the first offset speed and not being less than or equal to the reference speed minus the second offset speed.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
adjusting an output of a first speaker via one or more controllers in response to a speed of a first wheel being greater than or equal to a reference vehicle speed plus a first offset speed or less than or equal to the reference vehicle speed minus a second offset speed;

wherein the second offset speed is different from the first offset speed.

2. The method of claim 1, further comprising one of:
detecting that the speed of the first wheel is greater than or equal to the reference vehicle speed plus the first offset speed, and in response, lighting one or more of a first plurality of segments of a bar graph of a visual display of the vehicle to indicate a first extent of how much the speed of the first wheel is greater than the vehicle speed plus the first offset speed; and
detecting that the speed of the first wheel is less than or equal to the reference vehicle speed minus the second offset speed, and in response, lighting one or more of a second plurality of segments of the bar graph to indicate a second extent of how much the speed of the first wheel is less than the vehicle speed minus the second offset speed;
wherein the second plurality of segments is different from the first plurality of segments.

3. The method of claim 2, wherein the first speaker is physically closest to the first wheel as compared to other speakers in a group of speakers.

4. The method of claim 1, wherein adjusting output of the first speaker includes increasing a sound output level as a difference between the reference vehicle speed and the speed of the first wheel increases.

5. The method of claim 1, wherein adjusting output of the first speaker includes decreasing a sound output level as a difference between the reference vehicle speed and the speed of the first wheel decreases.

6. The method of claim 1, further comprising adjusting output of a second speaker via the one or more controllers in response to a speed of a second wheel being greater than or equal to the reference vehicle speed plus the first offset speed and less than or equal to the reference vehicle speed minus the second offset speed.

7. The method of claim 6, wherein the first wheel is on a front side of the vehicle and wherein the second wheel is on a rear side of the vehicle.

8. The method of claim 7, wherein adjusting output of the first speaker includes playing a sound through the first speaker.

9. The method of claim 8, wherein adjusting output of the first speaker includes interrupting playing of a second sound through the first speaker.

10. A vehicle system, comprising:
a visual display;
an audible sound system;
a controller including executable instructions stored in non-transitory memory that cause the controller to adjust one of the visual display and the audible sound system in response to a speed of a first wheel being greater than or equal to a reference vehicle speed plus a first offset speed or less than or equal to the reference vehicle speed minus a second offset speed;
wherein the second offset speed is different from the first offset speed.

11. The vehicle system of claim 10, wherein further instructions are stored in the non-transitory memory that when executed, cause the controller to perform one of:
detecting that the speed of the first wheel is greater than or equal to the reference vehicle speed plus the first offset speed, and in response, lighting one or more of a first plurality of segments of a bar graph of the visual display to indicate a first extent of how much the speed of the first wheel is greater than the vehicle speed plus the first offset speed; and
detecting that the speed of the first wheel is less than or equal to the reference vehicle speed minus the second offset speed, and in response, lighting one or more of a second plurality of segments of the bar graph to indicate a second extent of how much the speed of the first wheel is less than the vehicle speed minus the second offset speed;
wherein the second plurality of segments is different from the first plurality of segments.

12. The vehicle system of claim 11, wherein the first plurality of segments is colored differently than the second plurality of segments.

13. The vehicle system of claim 11, where the one or more of the first plurality of segments are lit in response to a driver demand pedal being applied.

14. The vehicle system of claim 11, where the one or more of the second plurality of segments are lit in response to a brake pedal being applied.

15. The vehicle system of claim 10, wherein further instructions are stored in the non-transitory memory that when executed, cause the controller to play a sound through a speaker that is physically closest to the first wheel in response to the speed of the first wheel being greater than or equal to the reference vehicle speed plus the first offset speed or less than or equal to the reference vehicle speed minus the second offset speed.

16. A method for a vehicle, comprising:
in a first condition, where a speed of a first wheel of the vehicle is greater than or equal to a reference vehicle speed plus a first offset speed, performing a first adjustment to an output of a device via one or more controllers of the vehicle to indicate a first extent of how much the speed of the first wheel is greater than the vehicle speed plus the first offset speed; and
in a second condition, where the speed of the first wheel is less than or equal to the reference vehicle speed minus a second offset speed, performing a second adjustment to the output of the device to indicate a second extent of how much the speed of the first wheel is less than the vehicle speed minus the second offset speed;
wherein the second offset speed is different from the first offset speed, and the first adjustment is different from the second adjustment.

17. The method of claim 16, wherein:
performing the first adjustment to the output of the device further comprises lighting one or more of a first plurality of segments of a bar graph of a visual display of the vehicle; and
performing the second adjustment to the output of the device further comprises lighting one or more of a second plurality of segments of the bar graph, the second plurality of segments different from the first plurality of segments.

18. The method of claim 17, wherein the first adjustment is performed when a driver demand pedal is applied.

19. The method of claim 18, wherein the second adjustment is performed when a brake pedal is applied.

20. The method of claim 17, wherein the device is a haptic device that vibrates a steering wheel or a seat track.

* * * * *